(12) United States Patent
Monguzzi et al.

(10) Patent No.: US 7,222,522 B2
(45) Date of Patent: May 29, 2007

(54) METHOD FOR MEASURING AT LEAST ONE CHARACTERISTIC PROPERTY OF A PNEUMATIC TIRE FOR A VEHICLE WHEEL

(75) Inventors: Carlo Monguzzi, Monza (IT); Franco Rossi, Cinisello Balsamo (IT); Paolo Brivio, Carimate (IT); Giuseppe Matrascia, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/535,309

(22) PCT Filed: Dec. 20, 2002

(86) PCT No.: PCT/IT02/00815

§ 371 (c)(1),
(2), (4) Date: Dec. 14, 2005

(87) PCT Pub. No.: WO2004/057292

PCT Pub. Date: Jul. 8, 2004

(65) Prior Publication Data

US 2006/0123897 A1    Jun. 15, 2006

(51) Int. Cl.
*G01M 17/02* (2006.01)
(52) U.S. Cl. .......................................... 73/146; 340/445
(58) Field of Classification Search ................. 73/146, 73/146.5; 340/445
See application file for complete search history.

(56) References Cited

U.S. PATENT DOCUMENTS 5,247,831 A * 9/1993 Fioravanti ................. 73/178 R
5,269,186 A * 12/1993 Yopp ........................... 73/457
5,749,984 A    5/1998 Frey et al.
6,343,506 B1   2/2002 Jones et al.
6,561,018 B2 * 5/2003 Mancosu et al. ............. 73/146
6,959,593 B2 * 11/2005 Mancosu et al. ............. 73/146
2005/0093539 A1 * 5/2005 Salfelner ................ 324/207.25

FOREIGN PATENT DOCUMENTS

EP    0 656 269 A1    6/1995
WO   WO 01/68388 A1   9/2001

* cited by examiner

*Primary Examiner*—Andre Allen
(74) *Attorney, Agent, or Firm*—Finnegan, Henderson, Farabow, Garrett & Dunner, L.L.P.

(57) ABSTRACT

A method for measuring at least one characteristic property of a pneumatic tire for a vehicle wheel includes arranging at least one array of deformable sensors along a first direction; making the tire pass at speed over the sensors along a second direction; generating an electrical signal proportional to a speed of deformation of each sensor when the tyre contacts the sensor; detecting the electrical signal generated by each sensor; and determining, starting with the detected signals, the at least one characteristic property. The second direction is a motion direction of the tire. The first direction is transverse to the second. The at least one array of sensors extends in the first direction for a distance greater than or equal to a dimension of the tire in the first direction. When the at least one array includes a plurality of arrays, the arrays may be arranged substantially in parallel.

16 Claims, 16 Drawing Sheets

METHOD FOR MEASURING AT LEAST ONE CHARACTERISTIC PROPERTY OF A PNEUMATIC TIRE FOR A VEHICLE WHEEL

CROSS-REFERENCE TO RELATED APPLICATIONS

This application is a national-phase entry under 35 U.S.C. § 371 from International Application No. PCT/IT2002/000815, filed Dec. 20, 2002, in the Italian Patent Office, the content of which is relied upon and incorporated herein by reference.

BACKGROUND OF THE INVENTION

1. Field of the Invention

The present invention, in its most general aspect, relates to a method for measuring characteristic properties of a pneumatic tyre for vehicle wheels. More specifically, the invention relates to a method for detecting the size of the footprint area of a pneumatic tyre for vehicle wheels in high-speed motion conditions, and the distribution of pressure on such a footprint area.

2. Description of the Related Art

Throughout the present description and the subsequent claims, the term: characteristic properties of a pneumatic tyre, is used to indicate, for example, the dimensions and/or the shape of the footprint area of the tyre, the distribution of pressure (or vertical forces) acting locally on the footprint area of the tyre, the tyre inflation pressure, the distribution of longitudinal and/or lateral forces acting on the tyre and the rolling resistance.

The term: footprint area, is used to indicate that zone of the tyre wherein the exchange of forces between the tyre and the road surface (or between the tyre and a device simulating the road surface, such as a rolling runway of a drum simulating the road surface) takes place, i.e. that zone of the tyre which is in contact with the road surface (or with the device simulating the road surface).

The term: high-speed, is used to indicate a speed greater than 30 km/h, preferably greater than 100 km/h, even more preferably greater than 200 km/h.

As known, a considerable part of the research in the field of tyres for vehicle wheels has as a primary object that of optimizing the design parameters of the tyre to ensure adequate behavior thereof in the foreseen operating conditions. For such a purpose, tyres are inspected and tested to detect some properties representing the behavior of the tyre in operation.

For example, it is used to measure the size and/or the shape of the footprint area of a tyre and to detect the variation of such a size and/or shape as the rolling speed of the tyre varies. Indeed, it is known that a properly designed tyre has a wide, rectangular or square footprint area which substantially does not change as the rolling speed of the tyre changes.

Also, it is used to measure the distribution of pressure on the footprint area of the tyre and, even in this case, to detect the variation of such a distribution of pressure as the rolling speed of the tyre varies. Indeed, it is known that a properly designed tyre has a substantially uniform distribution of pressure between the shoulders and the center of the tyre, such a distribution being also substantially invariable as the rolling speed of the tyre varies.

Thus, for example, U.S. Pat. No. 5,749,984 discloses a method for monitoring a tyre wherein a measurement of the size of the footprint area of the tyre is carried out by a sensor suitably housed inside the tyre. In the preferred embodiment thereof, the sensor is a piezoelectric element which deforms when the tyre comes into contact with the ground thus generating an electrical signal proportional to the speed of deformation thereof. The position of the sensor inside the tyre is described as being particularly critical for generating a suitable electrical signal.

The Applicant has observed that this system is an invasive detection system (i.e. the sensor is provided inside the tyre) and thus it involves complication in the production process of the tyre, as well as it requires the production of tyres ad hoc. The Applicant has also verified that a system as the one described in the patent identified above does not allow the actual duration of contact between tyre and road, and therefore the length of the footprint area of the tyre, to be determined with precision. Indeed, the signal generated by the sensor is influenced by phenomena which take place before or after the tyre contacts the road. The Applicant has also observed that such a patent does not provide any indication of the shape of the tyre footprint, nor of the distribution of pressure on the footprint area.

A non-invasive system for detecting the distribution of pressure on the footprint area of a tyre under almost static conditions is disclosed in patent application EP 0 656 269. Such a system provides for the use of a plurality of arrays of load sensors directly applied on the road surface. Such sensors directly measure the vertical forces acting upon the footprint area of the tyre and generate an electrical signal proportional to such forces. The Applicant observes that, in line with the disclosure of the aforementioned document, such a system is capable of detecting the distribution of pressure for static conditions or for rolling speeds of the tyre lower than 5–6 Km/h, greater speeds being ruled out due to the limited and/or insufficient frequency response of the load sensors.

SUMMARY OF THE INVENTION

The Applicant has faced the problem of detecting one or more characteristic properties of a pneumatic tyre (such as the size and/or shape of the footprint area and the distribution of pressure on the footprint area) in high-speed motion conditions (such as 100 km/h) by a non-invasive system and in generic operating conditions of the tyre and has perceived and verified that such a problem is solved by measuring the speed of deformation of at least one array of deformable sensors (i.e. the speed of the impact between tyre and sensors and therefore the variation of pressure on the sensors) and subsequently deriving from such a measurement, through simple calculation operations and/or simple detections or analyses of the measurement signal, the desired characteristic properties of the tyre (such as the length of the footprint area or the distribution of pressure on the footprint area).

Therefore, the present invention, in a general aspect thereof, relates to a method for measuring characteristic properties of a pneumatic tyre for vehicle wheels, comprising the steps of:

arranging at least one array of deformable sensors along a direction y transversal to a motion direction x of a pneumatic tyre for vehicle wheels, said at least one array of sensors extending for a length at least equal to the dimension of said pneumatic tyre along said direction y;

making said pneumatic tyre pass at speed over said at least one array of sensors along said motion direction x;

generating, for each sensor of said at least one array of sensors, an electrical signal proportional to a speed of deformation of said sensors when they contact said pneumatic tyre;

detecting said electrical signal generated by each sensor of said at least one array of sensors;

determining, starting from each detected electrical signal, at least one characteristic property of said pneumatic tyre.

Throughout the present description and the subsequent claims, the term: motion of a pneumatic tyre, is used to indicate any condition of movement of the pneumatic tyre with respect to the road surface or to any device simulating the road surface, such as the rolling runway of a drum simulating the road surface. Therefore, either motion by rolling and slipping or sliding of the tyre are considered. For the sake of simplicity, however, explicit reference will be made to a motion by rolling of the tyre.

Moreover, throughout the present description and the subsequent claims, the term: direction transversal to the motion direction of the pneumatic tyre, is used to indicate any direction tilted by an angle other than zero with respect to the motion direction of the tyre, and therefore not necessarily a direction perpendicular to the motion direction of the tyre, thus making it possible to analyze the behavior of the tyre even in slipping or camber conditions. For the sake of simplicity, however, explicit reference will be often made to a direction perpendicular to the motion direction of the tyre.

Again, throughout the present description and the subsequent claims, the term: characteristic properties of a pneumatic tyre, is used to indicate any quantity or parameter indicating a specific operating condition of the tyre, such as, for example, the size and/or shape of the footprint area of the tyre, the distribution of pressure on the footprint area, the inflation pressure of the tyre, the distribution of longitudinal and/or lateral forces acting upon the tyre, the rolling resistance. For the sake of simplicity, however, explicit reference will be often made to the size and/or shape of the footprint area of the tyre and/or to the distribution of pressure (vertical forces) on such a footprint area. Any person skilled in the art will, however, understand that the method of the present invention can also be carried out for measuring the other quantities listed above.

Advantageously, therefore, the method of the present invention allows the behavior of a tyre to be observed even in high-speed motion conditions and in generic operating conditions (for example in rolling, sliding, slipping and camber conditions of the tyre) by a non-invasive detection system, i.e. by sensors provided outside of the tyre. Preferably, the motion speed of the tyre is equal to or greater than 30 km/h, more preferably equal to or greater than 100 km/h, even more preferably equal to or greater than 200 km/h.

In accordance with the present invention, rather than directly detecting the forces acting on load sensors, as suggested in document EP 0 656 269, it is particularly advantageous to detect the speed of deformation of suitable deformable sensors which, unlike load sensors, have high frequency response, thus allowing the behavior of the tyre at high speeds to be detected. Also, the fact that such sensors are provided outside of the tyre makes the method of the present invention suitable for operating irrespective of the type and model of the tyre, without requiring the production of tyres ad hoc, nor complicating the production process thereof.

In accordance with the present invention, it is advantageously possible, for example, to determine the length of the footprint area of a tyre, in high-speed motion conditions, for the entire width of the tyre, and to outline the shape of such a footprint area, by simply arranging an array of deformable sensors along a direction transversal to the motion of the tyre and making the tyre pass over such sensors. Upon contacting the tyre, each sensor generates an electrical signal proportional to the speed of deformation of the sensor itself. By analyzing such an electrical signal it is possible to determine the length of the footprint area measured at the position in which the sensor is located. The overall shape and size of the footprint area are obtained by combining the analogue information obtained from the other sensors of the array of sensors.

By proceeding then with a simple integration in time of the electrical signals detected by the individual deformable sensors it is advantageously possible to determine also the distribution of pressure acting upon the footprint area of the tyre. The detection system of the present invention thus differs from the currently known non-invasive detection systems, as the one described in the aforementioned patent application EP 0 656 269, in that a direct measurement of the vertical forces acting upon the footprint area through load sensors is not carried out, but such forces are obtained through a simple calculation operation starting from a measurement of the speed of deformation of deformable sensors.

In accordance with a first way of implementation thereof, the method of the present invention is carried out to determine just the size and/or shape of a footprint area of a pneumatic tyre in high-speed movement.

In accordance with a second way of implementation thereof, the method of the present invention is carried out to determine just the distribution of the pressure acting upon the footprint area of a pneumatic tyre in high-speed movement.

In accordance with a preferred way of implementation thereof, the method of the present invention is carried out to determine either the size and/or shape of the footprint area of a pneumatic tyre in high-speed movement, and the distribution of pressure acting on such a footprint area. Through such a method the evolution of the size and/or shape of the footprint area and the distribution of pressure as the speed varies is also determined in conditions of rolling, slipping or sliding of the tyre.

In further ways of implementation thereof, the method of the present invention can also be carried out to determine other characteristic properties of a pneumatic tyre, as for example the inflation pressure thereof, the distribution of longitudinal and/or lateral forces and the rolling resistance.

In the preferred way of implementation of the method of the present invention, a plurality of arrays of sensors are arranged all substantially parallel and transversal to the motion direction x of the pneumatic tyre, so as to obtain a greater resolution in the determination of the size and/or shape of the footprint area of the tyre and/or in the distribution of pressure on such a footprint area. Preferably, the various arrays of sensors are ordered according to a staggered arrangement so as to obtain the desired resolution by providing a greater number of sensors in a predetermined detection area.

Preferably, the deformation sensors used in the method of the present invention comprise piezoelectric elements, such as pieces of piezoelectric cable, or piezoelectric film, or else quartz, in general being suitable for the purposes of the present invention all those materials which, when deformed, produce a concentration of electrical charge and thus an electrical signal (for example, an electrical current or voltage). Advantageously, the piezoelectric elements or the quartz do not require an electrical supply, thus simplifying the detection system of the present invention.

Even more preferably, the deformation sensors comprise piezoelectric cables which can be directly pressed by the tyre or, alternatively, by a plunger upon which the tyre impacts. Such sensors can be directly housed in a suitable seat provided on the road surface (in case of outdoor measurements) or on a rolling runway of a drum simulating the road surface (in case of indoor measurements). Preferably, the sensors are previously associated with a support plate which is then adapted to be housed on the road surface or on the drum simulating the road surface. This simplifies and accelerates the assembly, disassembly and adjustment operations of the individual sensors.

BRIEF DESCRIPTION OF THE DRAWINGS

Further characteristics and advantages of the present invention shall become clearer from the following detailed description of some embodiments or way of implementation thereof, made with reference to the attached drawings. In such drawings.

DETAILED DESCRIPTION OF THE EXEMPLARY EMBODIMENTS

Figure 1:
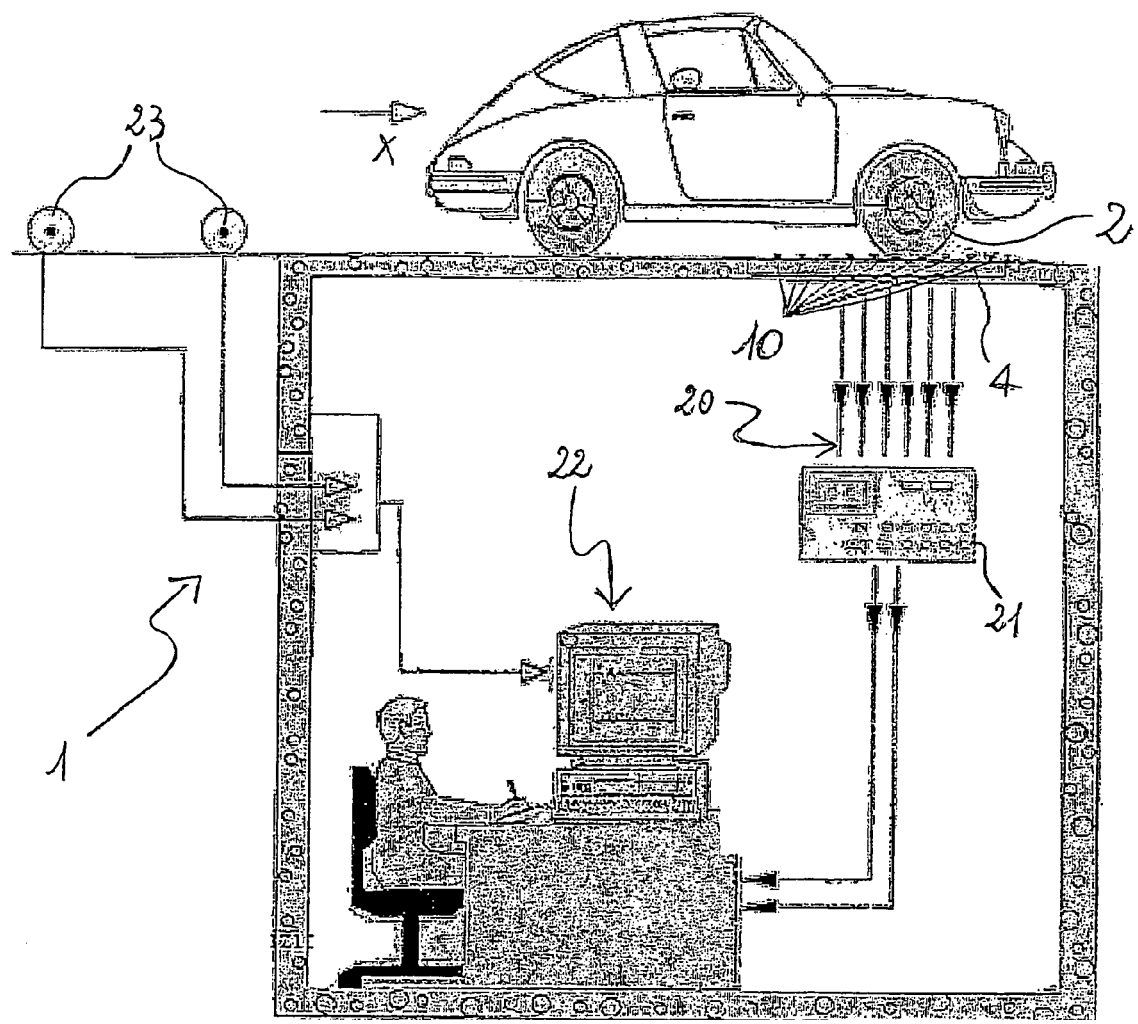
FIG. 1 shows a schematic view of a first embodiment of a system for measuring characteristic properties of a tyre which actuates the method of the present invention.
Figure 2:
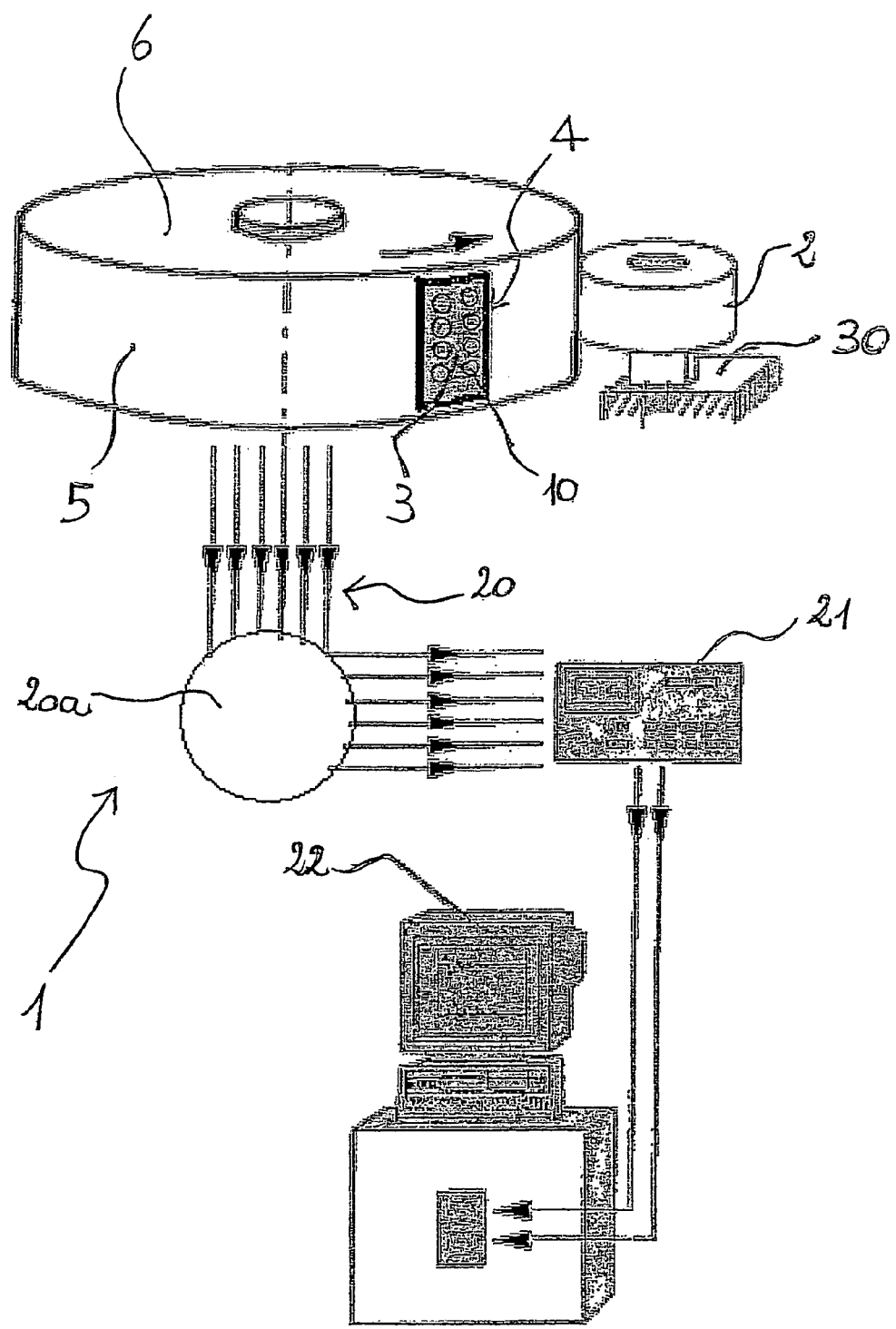
FIG. 2 shows a schematic view of a second embodiment of a system for measuring characteristic properties of a tyre which actuates the method of the present invention.

In FIGS. 1 and 2, a system for measuring characteristic properties of a tyre 2 for vehicle wheel in high-speed movement, in accordance with the method of the present invention, is indicated with 1. Preferably, the tyre 2 moves at a speed greater than 30 km/h, more preferably equal to or greater than 100 km/h and even more preferably equal to or greater than 200 km/h.

In particular, the system 1 allows one or more characteristic properties of the tyre 2 to be detected in order to evaluate the behavior of the tyre in generic operating conditions. Such properties are, for example, the size and/of shape of the footprint area of the tyre, the distribution of pressure on the footprint area, the inflation pressure of the tyre, the distribution of longitudinal and/or lateral forces acting upon the tyre, the rolling resistance. For the sake of simplicity, in the following of the present description we shall consider just the size and/or shape of the footprint area of the tyre and the distribution of pressure (of the vertical forces) on such a footprint area.

As illustrated in FIGS. 1 and 2 and as better described in the following of the present description, the system 1 which actuates the method of the present invention allows to carry out either outdoor measurements (FIG. 1) and indoor measurements (FIG. 2).

Figure 3:
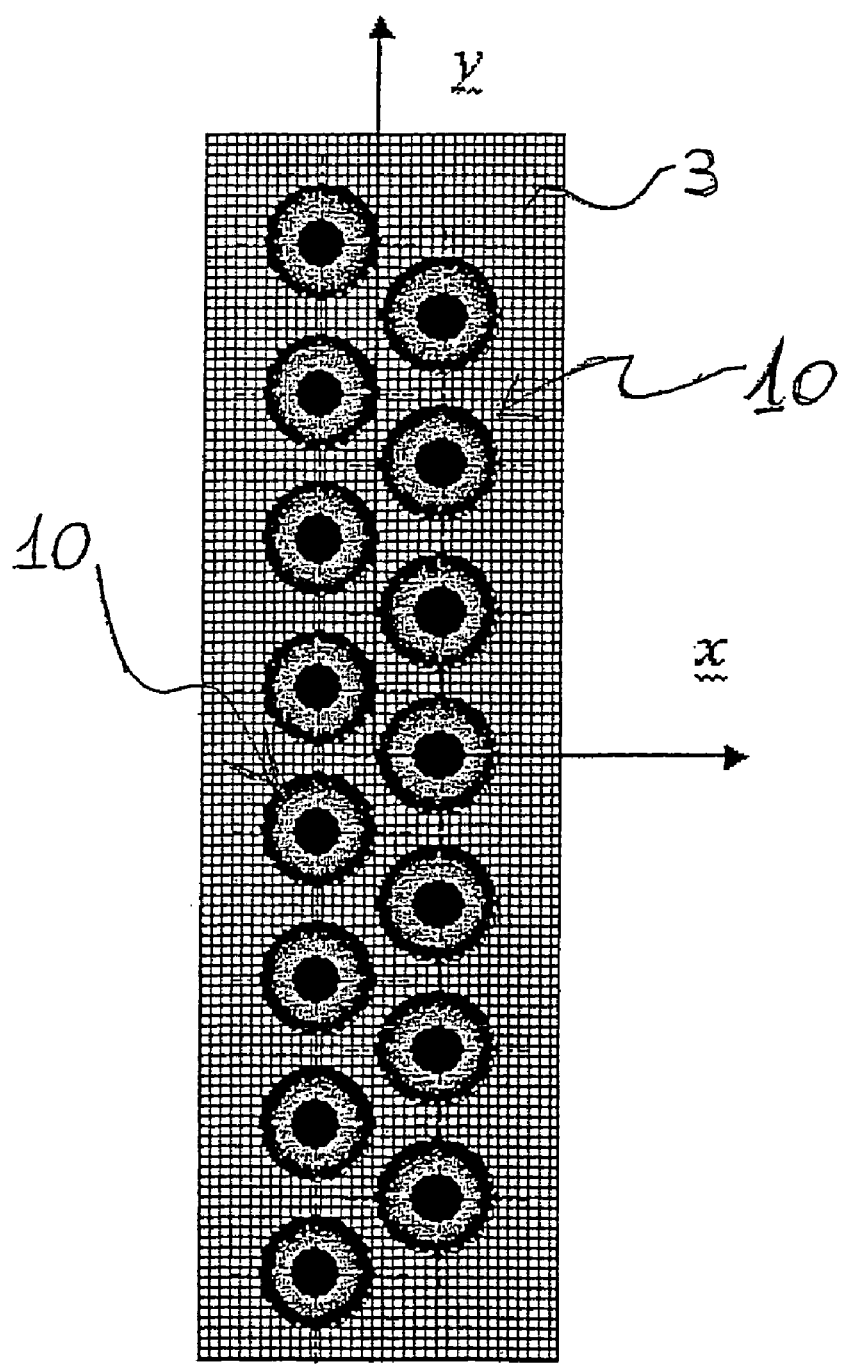
FIG. 3 shows a schematic view of a support plate for the sensors used in the method of the present invention.

Irrespective of the type of measurement (outdoor or indoor), the system 1 comprises a plurality of arrays of deformable sensors (all indicated with 10 in FIGS. 1, 2 and 3). In FIG. 1, in particular, ten arrays of sensors 10 are represented, whereas in FIGS. 2 and 3 just two arrays of sensors are represented. The arrays of sensors 10 are associated with a quadrangular support plate 3 (visible in FIGS. 2 and 3) adapted to be housed in a suitable seat 4 formed on the road surface (in case of outdoor measurements, see FIG. 1) or on a rolling runway 5 of a drum 6 simulating the road surface (in case of indoor measurements, see FIG. 2). In this last case the plate 3 is suitably calendared within the seat 4 formed on the drum 6.

The arrays of sensors are all arranged parallel along a direction y transversal, perpendicular in the illustrated example, to the motion direction x of the tyre 2 and extend along the direction y for a length at least equal to the dimension of the tyre 2 along said direction y. As better illustrated in FIG. 3, the arrangement of the various arrays of sensors 10 on the plate 3 is staggered along the direction y.

The sensors 10 are, in particular, deformation sensors, i.e. elements having the capability to concentrate electrical charges when subjected to deformation and then generate an electrical signal proportional to such a deformation. In particular, each of the sensors 10 comprises a piezoelectric element which is subjected to deformation as the tyre 2 passes over the sensor and generates an electrical signal proportional to the speed of deformation, i.e. to the speed of impact with the tyre 2, or in other words to the variation of pressure undergone by the sensor 10.

Figure 4:
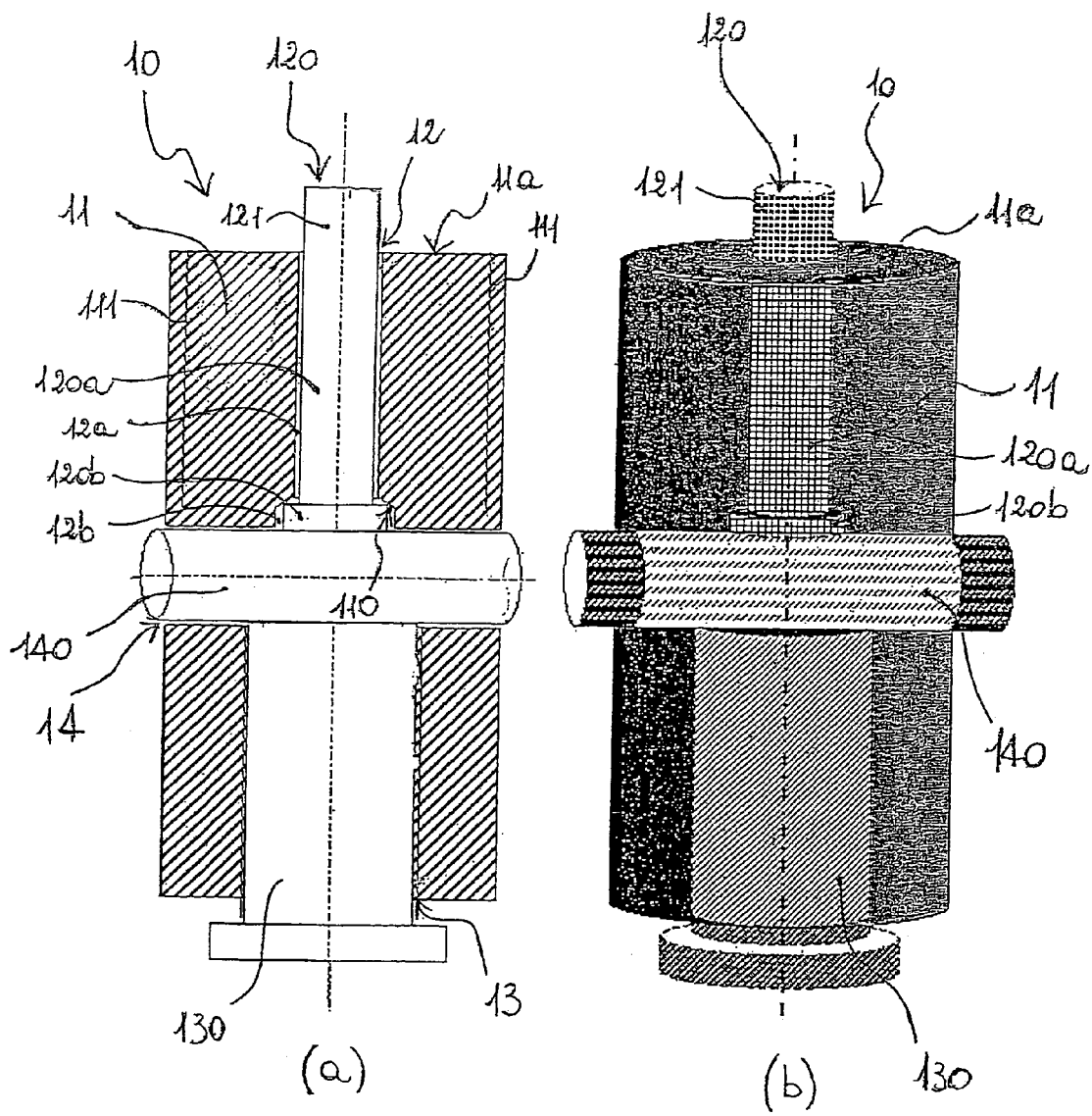
FIGS. 4(a) and 4(b) respectively show a schematic section view and a schematic perspective view-of a sensor of the support plate of FIG. 3.
Figure 5:
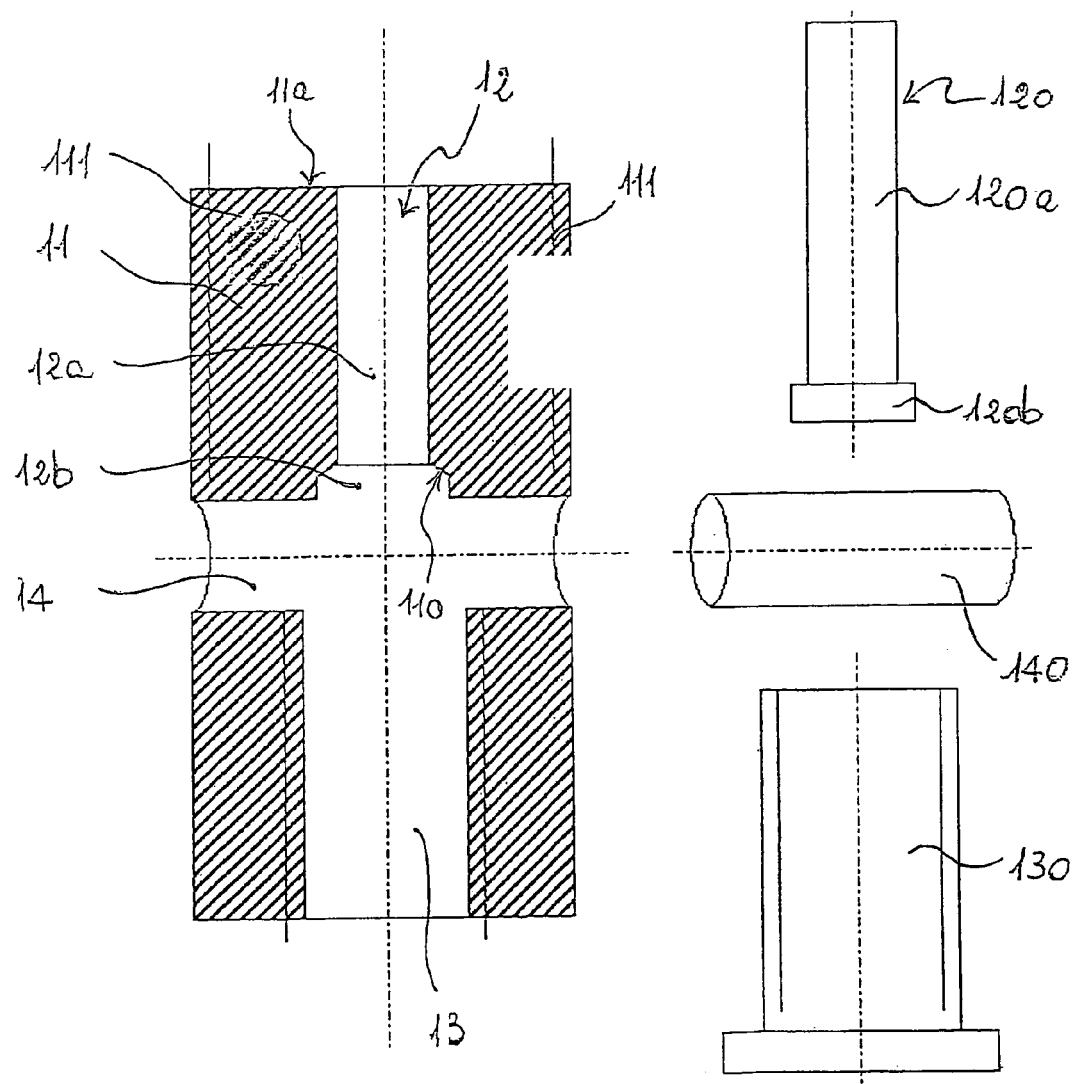
FIG. 5 schematically shows the sensor of FIGS. 4(a) and 4(b) in an exploded condition.

In the example illustrated in FIGS. 1 to 5, and with particular reference to FIGS. 4 and 5, the sensor 10 comprises a main body 11 in which a longitudinal through-hole 12, a longitudinal threaded through-hole 13 and a transversal through-hole 14 are formed. The through-hole 12 is formed at an upper portion of the main body 11 and has two portions of hole 12a and 12b, upper and lower respectively with a different diameter, the portion of hole 12b having a diameter greater than that of the portion of hole 12a. The threaded hole 13 is formed coaxially to the hole 12 at a lower portion of the main body 11. The transversal hole 14 is placed between the through-hole 12 and the threaded hole 13.

A plunger 120 made of steel is slidably housed in the through-hole 12. In particular, the plunger 120 comprises a first plunger portion 120a slidably housed in the portion of hole 12a, and a second plunger portion 120b with a greater diameter slidably housed in the portion of hole 12b.

A piezoelectric cable 140, which constitutes the deformable element of the sensor 10, is housed in the transversal hole 14. Such a cable is held always in contact with the plunger 120 by means of a preload screw 130 housed in the threaded hole 13.

In the main body 11, between the portion of hole 12a and the portion of hole 12b, an annular crown 110 is defined which is suitable for acting as an abutment surface for the plunger portion 120b. The annular crown 110 thus constitutes a mechanical stop for the plunger 120 which is thus prevented from escaping from the main body 11 through the portion of hole 12a.

The plunger 120 is sized so that, when the plunger portion 120b abuts upon the annular crown 110 of the body 11, an end portion 121 of the plunger 120 slightly protrudes from the upper face 11a of the main body 11, whereas the lower plunger portion 120b contacts the piezoelectric cable 140. The tyre 2, when passing on the sensor 10, impacts with the upper portion 121 of the plunger 120. The plunger is thus pushed to slide downwards, thus pressing upon the piezoelectric cable 140 which is thus deformed and which generates an electrical signal proportional to the speed of deformation, i.e. to the variation of pressure undergone.

The assembly of the sensor 10 takes place by firstly inserting the plunger 120 in the through-hole 12 through the threaded hole 13, then inserting the piezoelectric cable 140 in the transversal hole 14 and finally screwing the preload screw 130 into the hole 13 till the plunger 120 abuts the annular crown 110 of the main body 11 and gives the piezoelectric cable 140 the correct static preload.

The main body 11 has an outer threading 111 suitable for allowing the screwing of the sensor 10 into the plate 3. In substance, the body 11 consists of a hollow screw.

In an alternative embodiment (not illustrated) of the sensor 16, the piezoelectric cable 140 is arranged in a groove formed on the head of a screw which is in turn associated with the plate 3, or directly with the road surface or with the drum simulating the road surface, so as to be pressed directly by the tyre 2. Such a structural configuration of the sensor 10 is, however, less preferred with respect to the one described above which provides for the use of the plunger 120. This last configuration, indeed, ensures less distorted signals, greater amplifications and less wear of the piezoelectric cable 140.

The detection of the size and/or shape of the footprint area of a tyre takes place in the following way.

In outdoor detection systems (see FIG. 1), the vehicle which carries the tyre 2 is made to pass over the sensors 10 which are previously housed in the road surface. Upon contact with the tyre 2, each sensor 10 generates an electrical signal proportional to the speed of deformation.

The electrical signals obtained by the various sensors 10 are transmitted, through screened cables 20 suitably associated with the sensors 10 (and preferably through an amplification system 21) to a digital acquisition card of a data processing station 22, which takes care of extracting the desired information from the signals. The speed of the tyre 2 is detected through photocells 23 provided upstream of the sensors 10 along the motion direction x of the tyre 2. The signal generated by the photocells 23 is sent to the data processing station 22.

In indoor detection systems (see FIG. 2), the sensors 10 are housed on the rolling runway 5 of a drum 6 simulating the road surface. The tyre 2 is fitted onto the hub of a dynamometric rod 30 and is brought into contact with the drum 6 while controlling the vertical load, the slip and the camber. The rolling of the tyre 2 (at the predetermined speed) takes the sensors 10 into contact with the tyre 2, thus generating the electrical signals. Also in this case, the electrical signals obtained by the various sensors 10 are transmitted, through screened cables 20 suitably associated with the sensors 10 and connected through a rotary collector 20a, to a digital acquisition card of a data processing station 22, which takes care of extracting the desired information from the signals. Preferably, also in this case the signals are first amplified by an amplification system 21.

Figure 6:
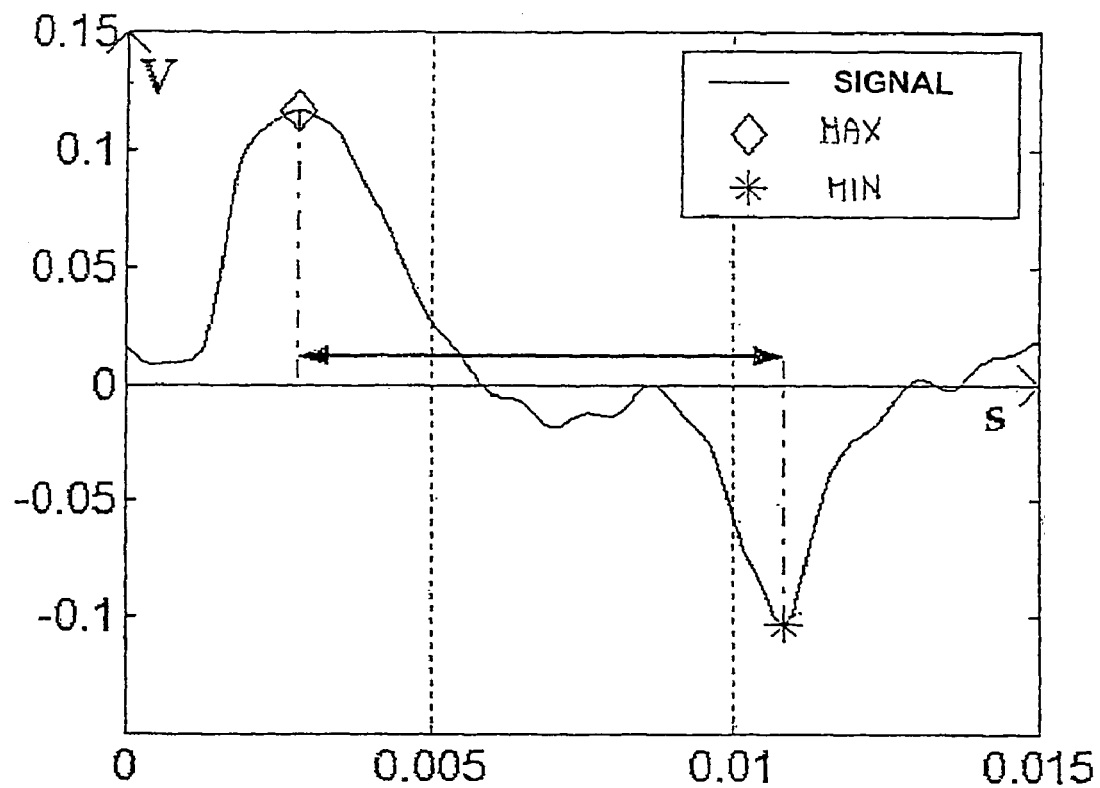
FIG. 6 shows the trend of the electrical, signal generated by the sensor of FIGS. 4(a) and 4(b) as a function of time.

As illustrated in FIG. 6, the electrical signal generated by each sensor 10 typically has a trend which from zero rapidly reaches a maximum amplitude (MAX) at a zone of first contact between sensor and tyre and, after a transition phase, a minimum amplitude (MIN) at a zone of end of contact between sensor and tyre. The spatial distance between these two characteristic points is proportional to the length of the footprint area measured at the position in which the sensor 10 is located. Such a length can easily be calculated knowing the motion speed of the tyre 2.

The overall shape and size of the footprint area are obtained by combining the analogue information obtained from the other sensors 10 arranged at different positions on the footprint. Since the signal emitted by each signal 10 is proportional to the speed of deformation thereof, and therefore to the variation of pressure on the sensor, an index of distribution of pressure on the footprint area of the tyre 2 is obtained by integrating such a signal in time. With the integrals coming from the other sensors the distribution of pressure on the whole of the footprint area of the tyre 2 is then determined.

EXAMPLE

The Applicant has carried out a series of tests to detect the size and shape of the footprint area of a tyre, the distribution of pressure on such a footprint area and the evolution of such properties as the inflation pressure of the tyre, its motion speed and the vertical load vary. Analogous tests have been carried out to measure characteristic properties of a tyre in conditions of right and left slip.

An indoor detection system of the type described in FIG. 2 was used. Seven sensors, of the type illustrated in FIGS. 3 to 5, were arranged in an array on a rolling runway of a drum simulating the road surface. The tyre to be monitored was mounted onto a dynamometric rod and was brought into contact with the drum. The tyre was made to rotate initially at a speed of 30 Km/h. The vertical load on the contact area between tyre and drum simulating the road surface was initially 3.000 N.

The signal obtained by each sensor had a trend as a function of time as illustrated in FIG. 6. Along the X-axis the time in seconds is shown and along the Y-axis the electrical signal in Volts is shown. The length of the footprint area at each sensor was determined by measuring the spatial distance between the point of maximum amplitude and the point of minimum amplitude of the signal and by multiplying such a distance by the speed of rotation of the tyre. The overall shape and size of the footprint area were obtained by combining the analogue information of the other sensors of the array.

By integrating the signal emitted by each sensor an index of distribution of pressure on the footprint was then obtained. By combining the analogue information obtained by the other sensors a three-dimensional pressure map was determined.

The aforementioned operations were repeated for different speed levels of the tyre and for different vertical loads acting upon the tyre. The following graphs and/or maps were obtained.

Figure 7:
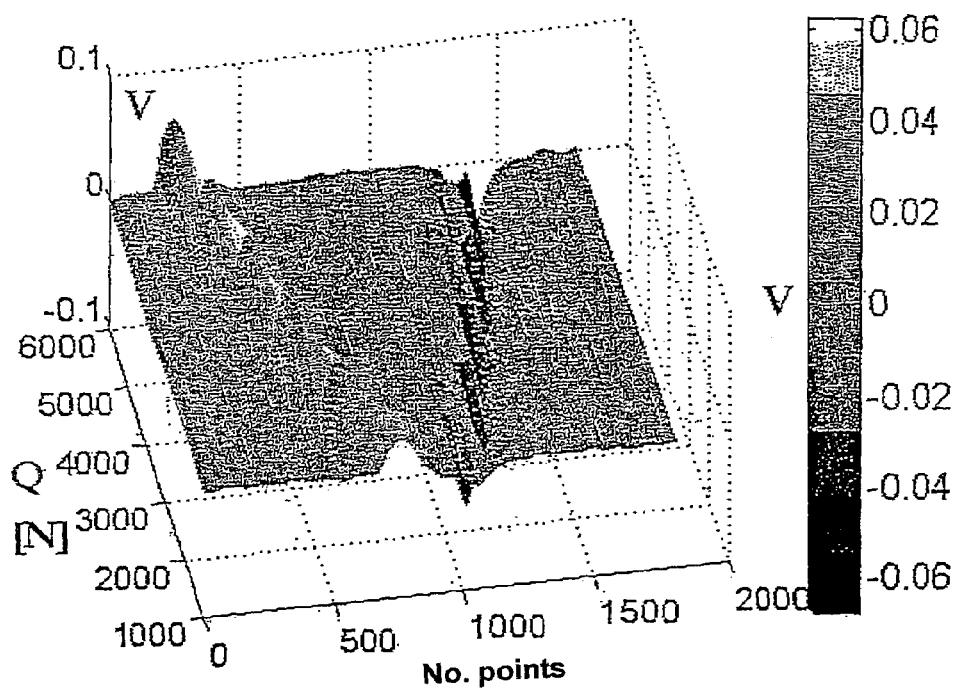
FIG. 7 shows the trend of the electrical signal of FIG. 6 as a function of the number of sampling points for six linearly increasing vertical loads.
Figure 8:
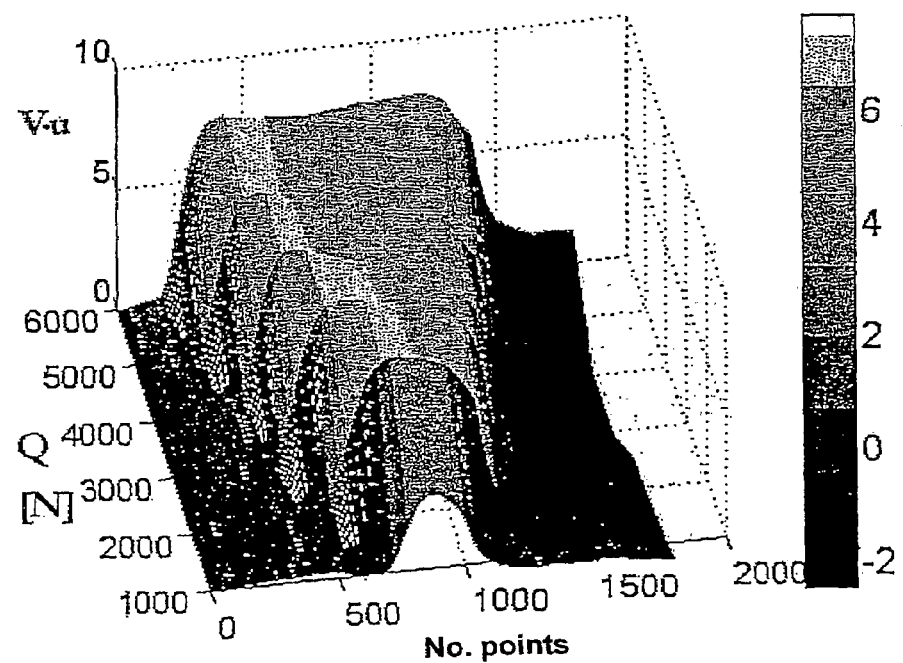
FIG. 8 shows the signals of FIG. 6 numerically integrated based upon the vector n° of points (Volts per unit)

The graph of FIG. 7 represents the signal (V) emitted by a sensor as a function of the number of sampling points (given the frequency of sampling a matrix of times is reconstructed and, knowing the motion speed of the tyre, the space vector is reconstructed) for six linearly increasing loads (Q) expressed in Newton. The graph of FIG. 8 shows the signals of FIG. 7 integrated numerically based upon the vector number of sampling points (Volts per unit).

Figure 9:
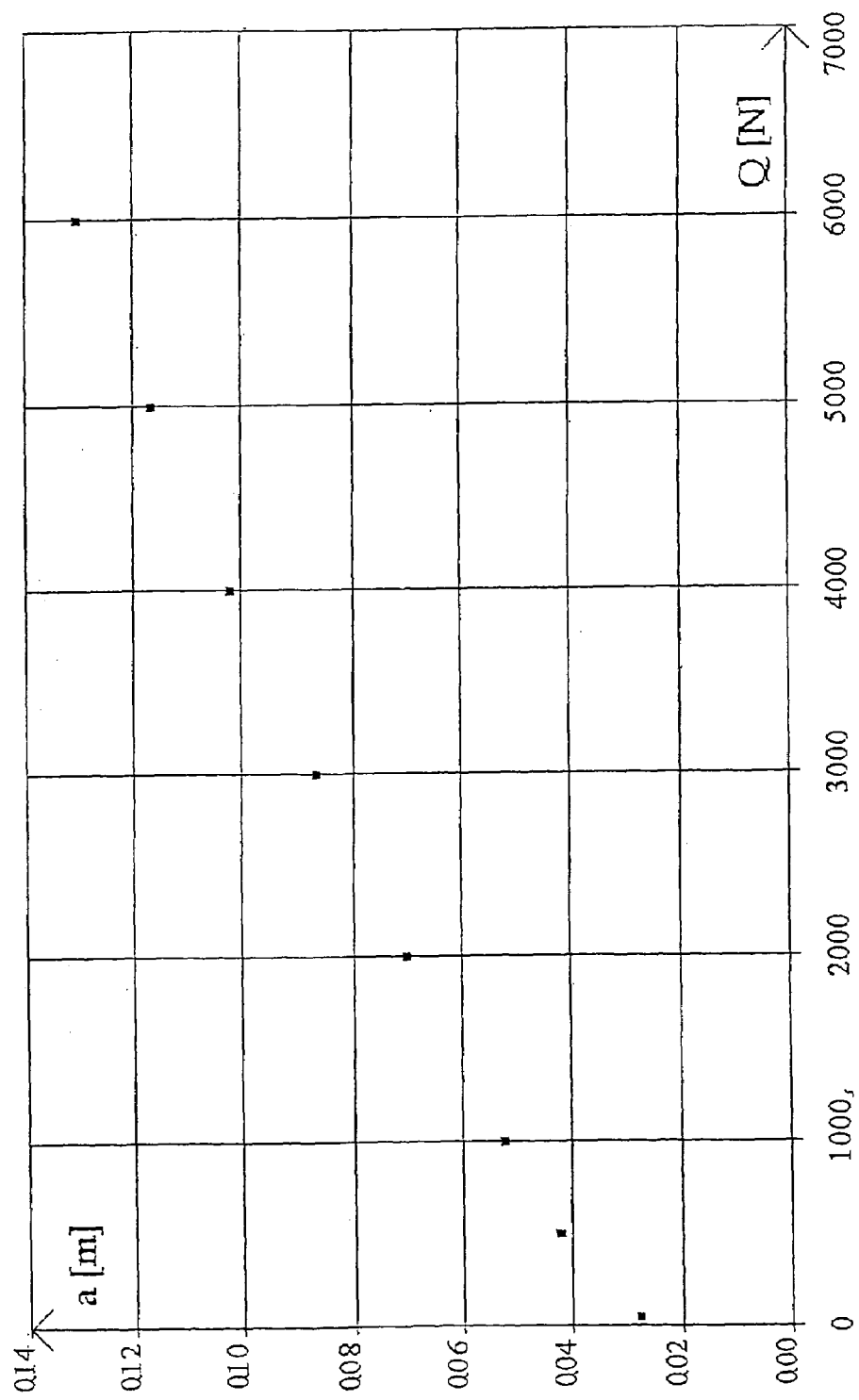
FIG. 9 shows the length of the footprint of the tyre at a sensor for six linearly increasing vertical loads.

The graph of FIG. 9 represents the length (a) in meters of the measured footprint at a sensor for six increasing loads (Q) expressed in Newton. It can be seen how the length of the footprint increases as the vertical load increases.

Figure 10:
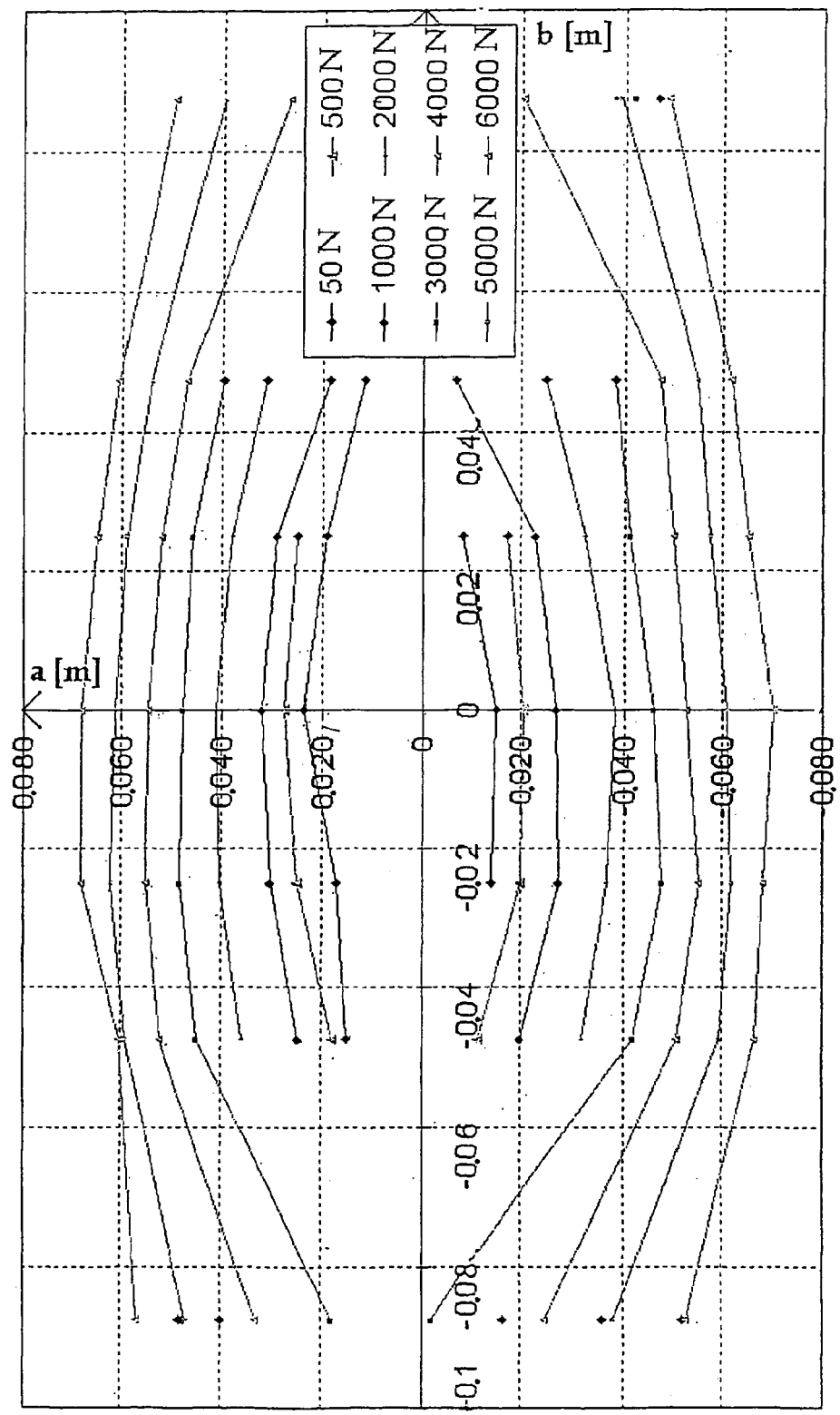
FIG. 10 shows the map of a footprint area of a tyre in high-speed motion conditions, obtained using seven sensors for eight linearly increasing vertical loads.

The graph of FIG. 10 shows the map of the footprint area considering all of the sensors of the array and for eight increasing vertical loads. Along the X-axis the position (b) of the various sensors (in meters) along the array (and therefore the width of the footprint area) is shown and along the Y-axis the length (a) of the footprint area (in meters) at each sensor is shown, whereas the variation parameter is the vertical load expressed in Newton (N). Such a graph substantially shows the shape and size (length (a) and width (b)) of the footprint area of the tyre for eight different loads. It can be seen how the footprint area increases as the vertical load increases.

Figure 11:
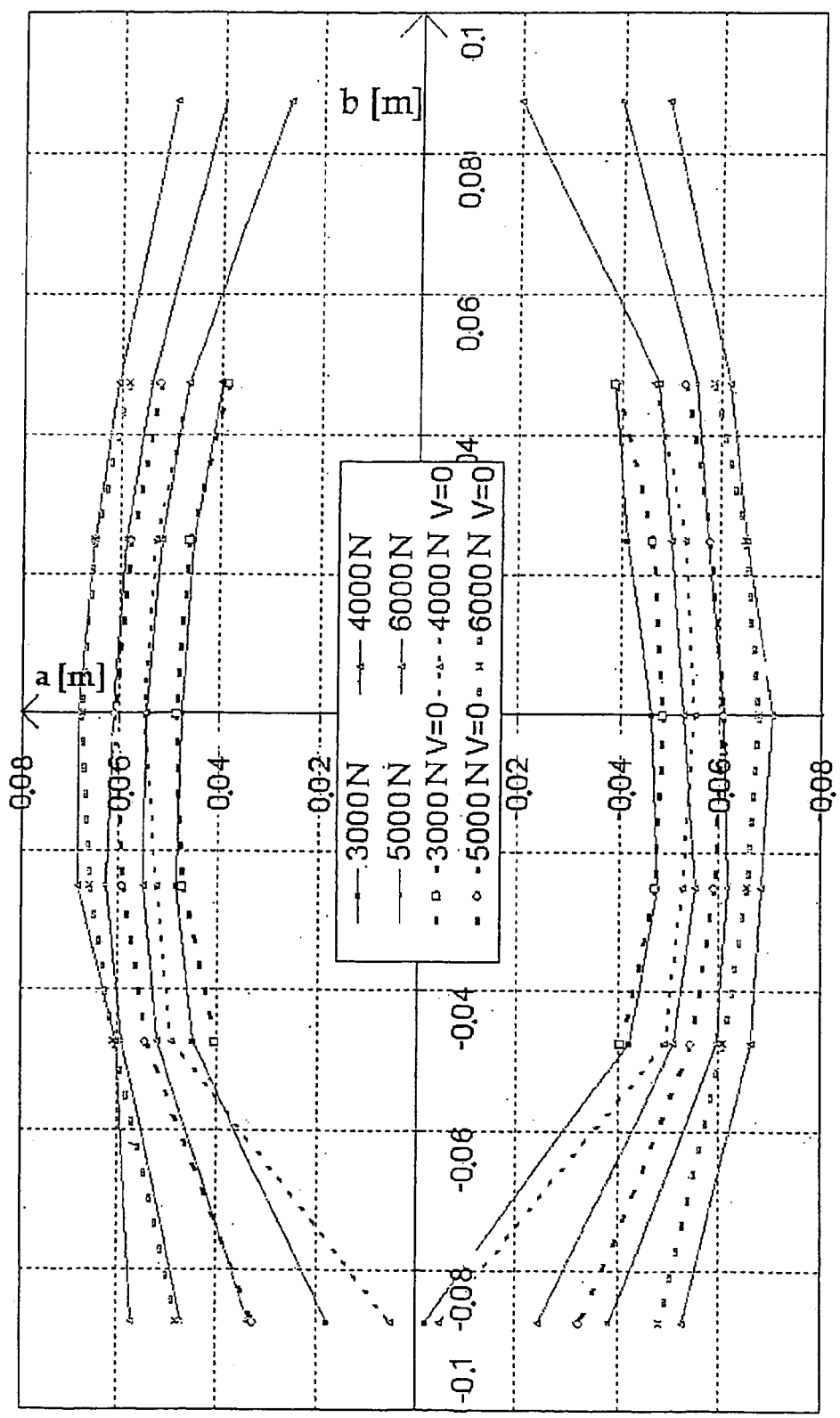
FIG. 11 shows the map of FIG. 10 compared with the one obtained in static conditions.

The graph of FIG. 11 compares the map of FIG. 10 with the one obtained in static conditions (V=0) with the same vertical loads.

Figure 12:
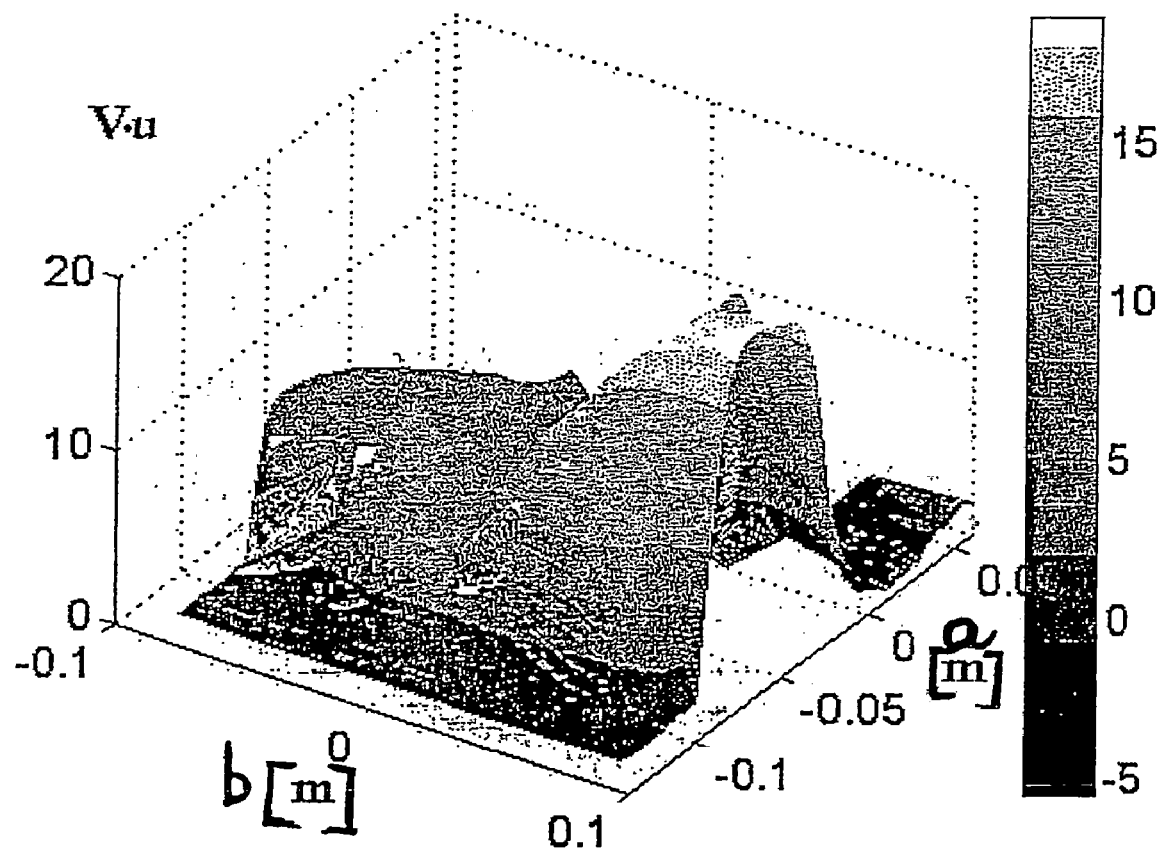
FIG. 12 shows a three-dimensional map of the distribution of pressure on the footprint area.

The graph of FIG. 12 shows a three-dimensional map of the distribution of pressure on the footprint area. The horizontal axes show the position (b) of the sensors in the array (and thus the width of the footprint area) and the length (a) of the footprint area at each sensor. The vertical axis shows the signals of FIG. 7 integrated numerically based upon the vector number of sampling points (Volts per unit). The effect of a small camber angle should be noted: on the right there is a significant distribution of pressure.

Figure 13A:
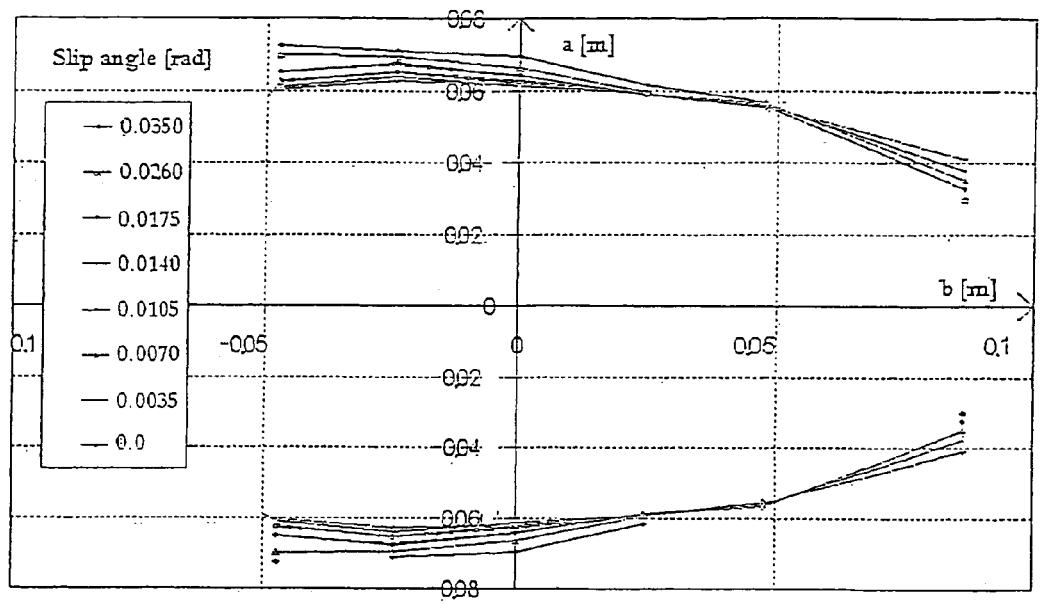
FIG. 13a shows the evolution of the size of the footprint area for a right slip test.
Figure 13B:
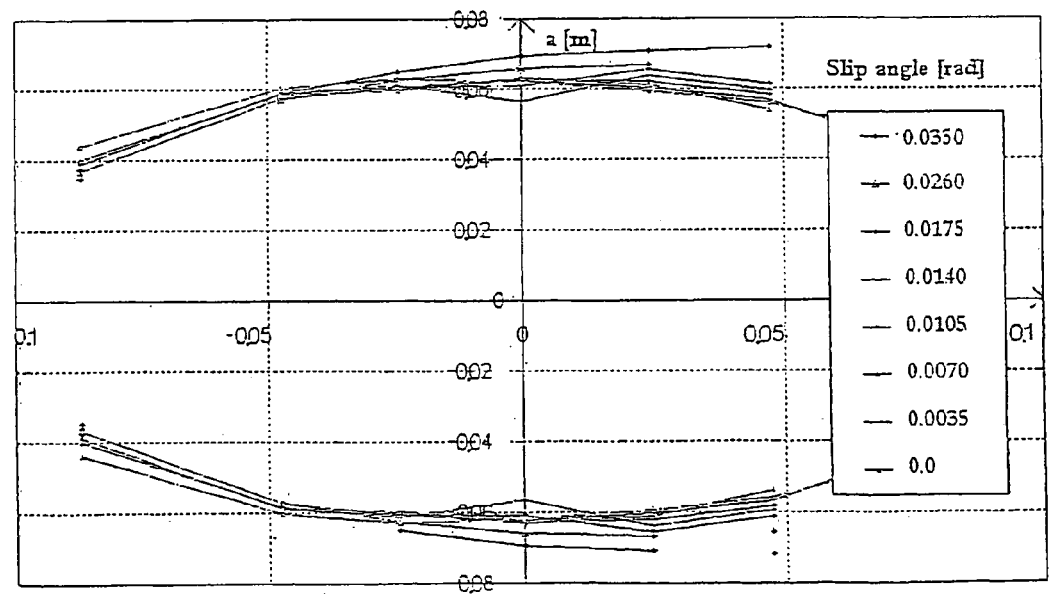
FIG. 13b shows the evolution of the size of the footprint area for a left slip test.
Figure 14A:
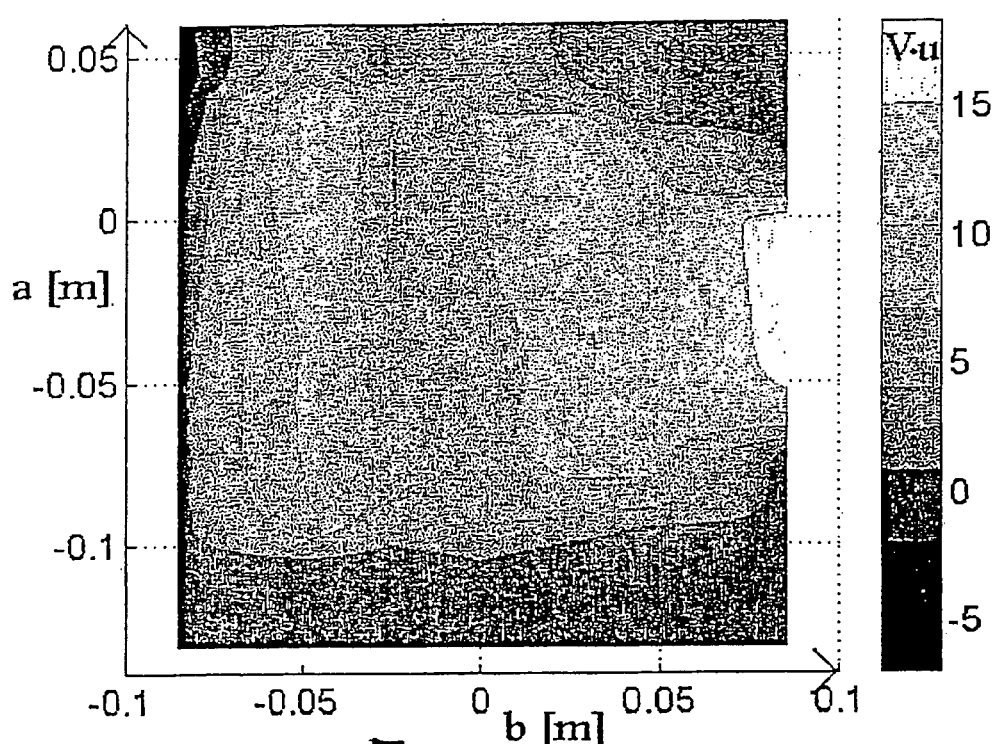
FIG. 14a shows the map of distribution of pressure on the footprint area for a right slip test.
Figure 14B:
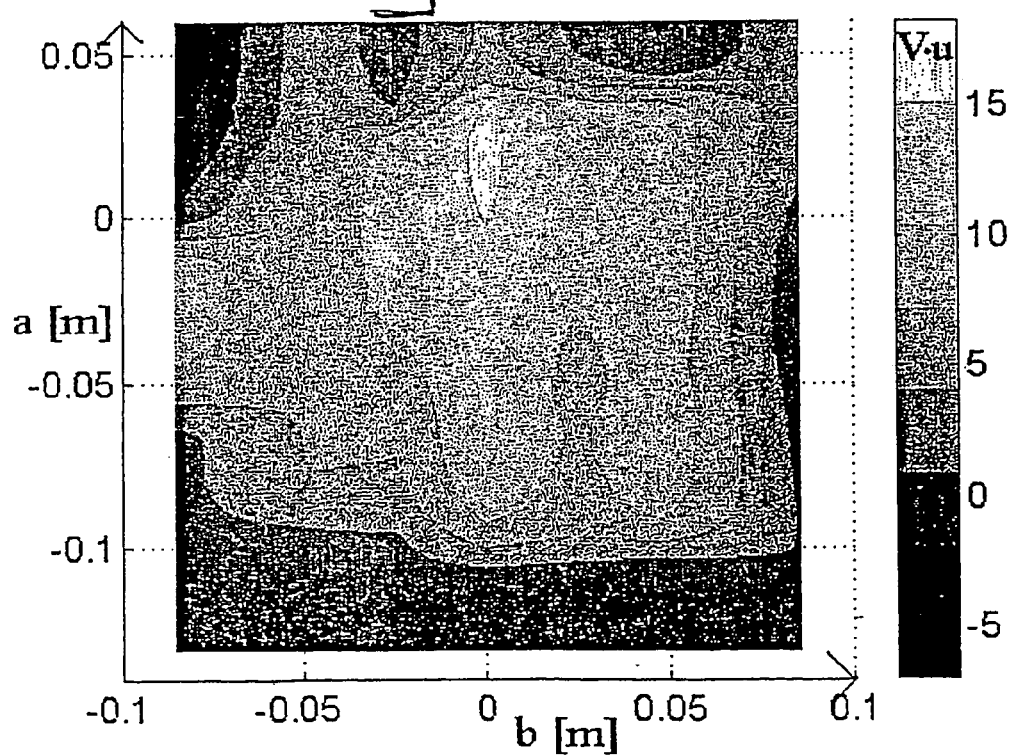
FIG. 14b shows the map of distribution of pressure on the footprint area for a left slip test.

The graphs of FIGS. 13a and 13b show the evolution of the size (length (a) and width (b)) of the footprint for a right and left slip test, respectively, for different slip angles expressed in radians. The maps of FIGS. 14a and 14b, on the other hand, show the map of distribution of pressure on the footprint area for a 2 degree right and left slip test, respectively. The specular behavior of the footprint is clear.

Figures 15A, 15B, 15C:
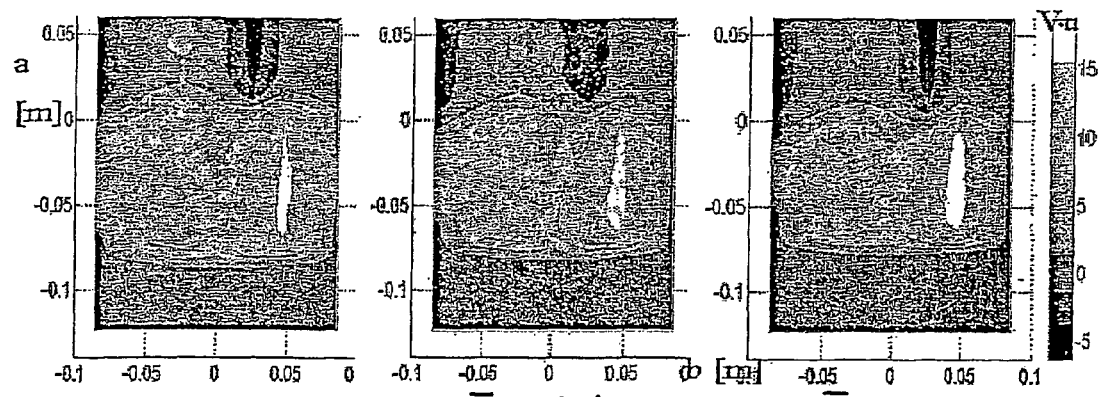
FIGS. 15a, 15b, 15c show the maps of distribution of pressure on the footprint area for three increasing levels of inflation pressure
Figure 15D:
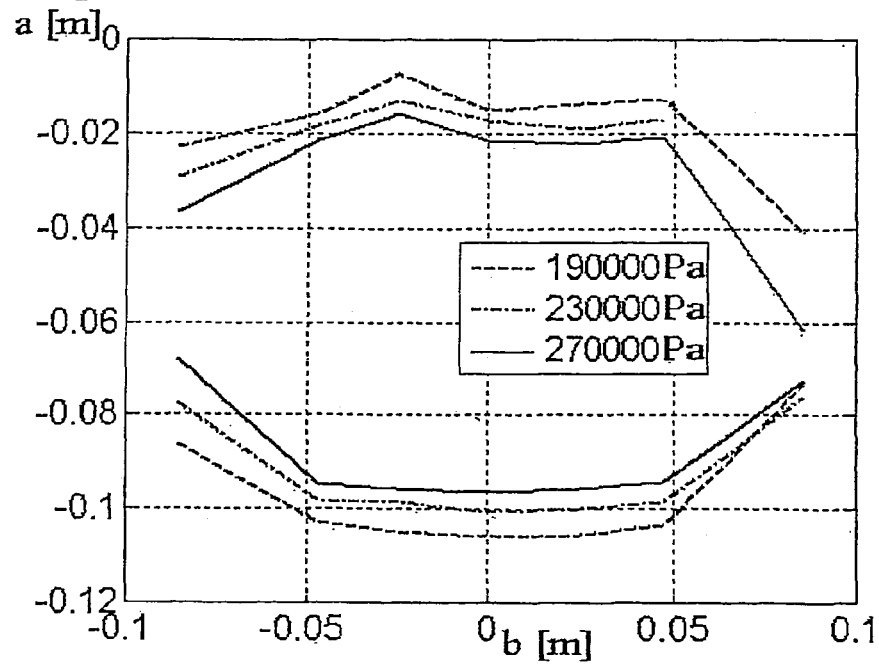
FIG. 15d shows the relative shapes of the footprint area.

FIGS. 15a, 15b, 15c show the maps of distribution of pressure on the footprint area for three increasing levels of inflation pressure expressed in Pascal (Pa) and FIG. 15d shows the relative shapes of the footprint area. It can be seen how the footprint area reduces as the inflation pressure increases, with a constant vertical load.

Figures 16A, 16B, 16C:
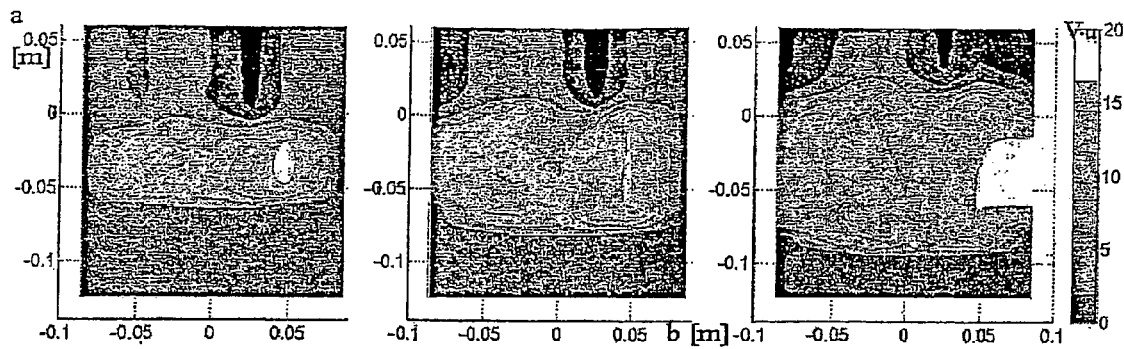
FIGS. 16a, 16b, 16c show the maps of distribution of pressure on the footprint area for three increasing levels of vertical load
Figure 16D:
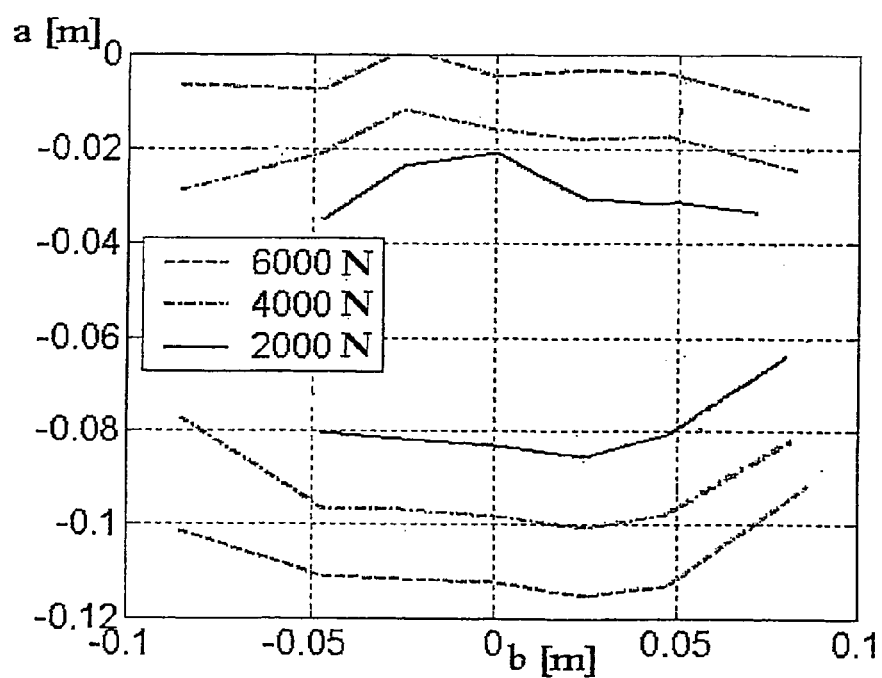
FIG. 16d shows the relative shapes of the footprint area.

FIGS. 16a, 16b, 16c show the maps of distribution of pressure on the footprint area for three increasing levels of vertical load expressed in Newton (N) and FIG. 16d shows the relative shapes of the footprint area. It can be seen how the footprint area increases as the vertical load increases.

Figures 17A, 17B, 17C:
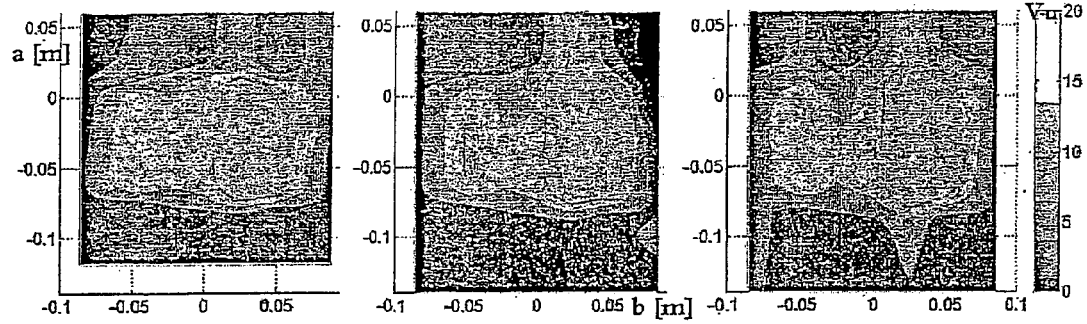
FIGS. 17a, 17b, 17c show the maps of distribution of pressure on the footprint area for three increasing levels of motion speed of the tyre
Figure 17D:
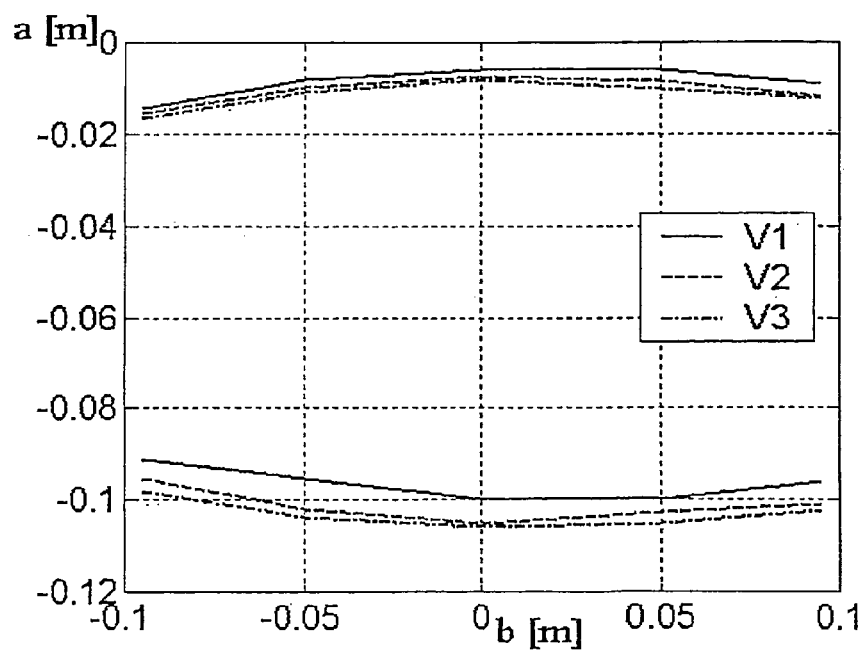
FIG. 17d shows the relative shapes of the footprint area.

FIGS. 17a, 17b, 17c show the maps of distribution of pressure on the footprint area for three increasing levels of motion speed (V1, V2, V3, equal to 50, 100, 150 Km/h, respectively) and FIG. 17d shows the relative shapes of the footprint area.

The previous description was made with particular reference to a preferred embodiment of the system and/or method of the present invention and to some variants thereof. The man skilled will however will understand that many other modifications or further alternatives can be taken into consideration without departing from the scope of protection of the present invention as claimed hereafter. For example, instead of piezoelectric cables it is possible to use piezoelectric film or quartz elements or, in general, any material which, when deformed, produces a concentration of electrical charge and, therefore, an electrical signal. Moreover, the distance between the maximum and minimum amplitude of the electrical signal generated by the sensors was taken into consideration to calculate the length of the footprint area. Such a length can however be calculated by taking into consideration the zeros of the integrals in time of such a signal, or two other reference points of the signal. In any case, it is possible to obtain a quantity correlated with the length of the footprint at a specific sensor, provided the criterion of choice of the characteristic points is always the same for all of the sensors of the array of sensors. Moreover, the transmission of the signals from the sensors 10 to the data processing station 22 can be carried out through radio frequency transmitters.

The invention claimed is:

1. A method for measuring at least one characteristic property of a pneumatic tyre for a vehicle wheel, comprising:
    arranging at least one array of deformable sensors along a first direction;
    making the tyre pass at speed over the at least one array of sensors along a second direction;
    generating, for each sensor, an electrical signal proportional to a speed of deformation of the sensor when the tyre contacts the sensor;
    detecting the electrical signal generated by each sensor; and
    determining, starting with the detected electrical signals, the at least one characteristic property of the tyre;
    wherein the second direction is a motion direction of the tyre,
    wherein the first direction is transverse to the second direction, and
    wherein the at least one array of sensors extends in the first direction for a distance greater than or equal to a dimension of the tyre in the first direction.

2. The method of claim 1, wherein the at least one characteristic property of the tyre is a size of a footprint area of the tyre along the second direction.

3. The method of claim 1, wherein the at least one characteristic property of the tyre is a shape of a footprint area of the tyre.

4. The method of claim 1, wherein the at least one characteristic property of the tyre is a distribution of pressure acting on a footprint area of the tyre.

5. The method of claim 1, wherein the speed of the tyre is greater than or equal to 30 kilometers per hour.

6. The method of claim 1, wherein the at least one array of sensors is housed in a seat formed on a drum of a wheel simulating a road surface.

7. The method of claim 1, wherein the at least one array of sensors is housed in a seat formed on a road surface.

8. The method of claim 1, wherein the at least one array of sensors is associated with a support plate.

9. A method for measuring at least one characteristic property of a pneumatic tyre for a vehicle wheel, comprising:
- arranging a plurality of arrays of deformable sensors along a first direction;
- making the tyre pass at speed over the plurality of arrays of sensors along a second direction;
- generating, for each sensor, an electrical signal proportional to a speed of deformation of the sensor when the tyre contacts the sensor;
- detecting the electrical signal generated by each sensor; and
- determining, starting with the detected electrical signals, the at least one characteristic property of the tyre;
- wherein the second direction is a motion direction of the tyre,
- wherein the first direction is transverse to the second direction,
- wherein the plurality of arrays of sensors extends in the first direction for a distance greater than or equal to a dimension of the tyre in the first direction, and
- wherein the arrays of sensors are arranged substantially in parallel.

10. The method of claim 8, wherein the at least one characteristic property of the tyre is a size of a footprint area of the tyre along the second direction.

11. The method of claim 9, wherein the at least one characteristic property of the tyre is a shape of a footprint area of the tyre.

12. The method of claim 9, wherein the at least one characteristic property of the tyre is a distribution of pressure acting on a footprint area of the tyre.

13. The method of claim 9, wherein the speed of the tyre is greater than or equal to 30 kilometers per hour.

14. The method of claim 9, wherein the plurality of arrays of sensors is housed in a seat formed on a drum of a wheel simulating a road surface.

15. The method of claim 9, wherein the plurality of arrays of sensors is housed in a seat formed on a road surface.

16. The method of claim 9, wherein the plurality of arrays of sensors is associated with a support plate.

\* \* \* \* \*